(12) United States Patent
Kashiwase et al.

(10) Patent No.: US 8,221,192 B2
(45) Date of Patent: Jul. 17, 2012

(54) MAGNETIC-RECORDING-DISK TEST-HEAD AND METHOD OF MANUFACTURING A MAGNETIC-RECORDING DISK USING THE MAGNETIC-RECORDING-DISK TEST-HEAD

(75) Inventors: Hidekazu Kashiwase, Kanagawa (JP); Hiroyuki Suzuki, Kanagawa (JP); Masae Suzuki, legal representative, Kanagawa (JP); Mitsuhiro Shoda, Kanagawa (JP); Takayoshi Ohtsu, Kanagawa (JP); Kiyoshi Hashimoto, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/537,982

(22) Filed: Aug. 7, 2009

(65) Prior Publication Data
US 2011/0069410 A1 Mar. 24, 2011

(30) Foreign Application Priority Data
Aug. 7, 2008 (JP) .................................. 2008-203680

(51) Int. Cl.
*B24B 49/00* (2012.01)

(52) U.S. Cl. .............................................. 451/5; 451/63
(58) Field of Classification Search .................. 451/5, 8, 451/63
See application file for complete search history.

(56) References Cited

U.S. PATENT DOCUMENTS

| 4,845,816 | A | * | 7/1989 | Nanis | 29/90.01 |
| 6,230,380 | B1 | * | 5/2001 | Wang et al. | 29/90.01 |
| 6,435,016 | B1 | * | 8/2002 | Smith et al. | 73/105 |
| 7,255,636 | B2 | * | 8/2007 | Hu et al. | 451/319 |
| 2003/0192167 | A1 | * | 10/2003 | Beckle et al. | 29/603.12 |

FOREIGN PATENT DOCUMENTS
JP  11016163  1/1999
* cited by examiner

*Primary Examiner* — Maurina Rachuba

(57) ABSTRACT

A magnetic-recording-disk test-head. The magnetic-recording-disk test-head includes a slider, a test pad and a slider-surface-shape control mechanism. The slider includes a leading edge and a trailing edge. The test pad is disposed at a trailing-edge side of the slider and is configured to remove and to detect asperities on a magnetic-recording disk. The slider-surface-shape control mechanism is configured to change a shape of an air-bearing surface of the slider and is disposed at a leading-edge side of the slider.

11 Claims, 16 Drawing Sheets

MAGNETIC-RECORDING-DISK TEST-HEAD AND METHOD OF MANUFACTURING A MAGNETIC-RECORDING DISK USING THE MAGNETIC-RECORDING-DISK TEST-HEAD

CROSS-REFERENCE TO RELATED APPLICATION

This application claims priority from the Japanese Patent Application No. 2008-203680, filed Aug. 7, 2008, the disclosure of which is incorporated herein in its entirety by reference.

TECHNICAL FIELD

Embodiments of the present invention relate to manufacture of a magnetic-recording disk for a hard-disk drive, and a magnetic-recording-disk test-head used for inspection of a magnetic-recording disk in the manufacture of a magnetic-recording disk.

BACKGROUND

In the manufacture of a magnetic-recording disk, a glide-height test may be performed using a glide-head after removing foreign substances from the recording surface of the magnetic-recording disk by using a burnish-head. In removing foreign substances, a burnish-head including a slider formed of a mixture of alumina, $Al_2O_3$, and titanium carbide, TiC, is used. A suspension upon which the burnish-head is mounted is swept over the recording surface of the magnetic-recording disk. The sweeping action of a rotary actuator, or arm of a head loader of a spinstand, upon which the suspension is mounted in combination with the burnishing action of the burnish-head remove undesired small asperities and dust from the recording surface of the magnetic-recording disk. The burnish-head is structured to have approximately the same shape and size as the shape and size of a magnetic-recording head used in a functional hard-disk drive (HDD). An air-bearing surface (ABS) of the slider is designed with a special shape to conveniently remove asperities and similar undesirable artifacts from the recording surface of the magnetic-recording disk. The glide-head, which is used in the glide-height test, also includes a slider formed of a mixture of alumina, $Al_2O_3$, and titanium carbide, TiC. A suspension upon which the glide-head is mounted includes a piezoelectric element and lead wires. When the glide-head is flown over the recording surface of the magnetic-recording disk, if the slider of the glide-head should encounter a foreign substance, for example, such as dust or an abnormal asperity, an impulse wave is transmitted to the piezoelectric element. When the impulse wave is transmitted, a voltage is generated in the piezoelectric element, and the voltage is extracted through a lead wire and monitored.

Thus, as described above and is known in the art, the smoothness and cleanliness of the recording surface of a magnetic-recording disk may be inspected. Manufacturing and development engineers skilled in the art of magnetic-recording-disk manufacture are engaged in the development of methods and apparatuses that increase the yields in and facilitate the manufacture of clean and smooth magnetic-recording disks.

SUMMARY

Embodiments of the present invention include a magnetic-recording-disk test-head. The magnetic-recording-disk test-head includes a slider, a test pad and a slider-surface-shape control mechanism. The slider includes a leading edge and a trailing edge. The test pad is disposed at a trailing-edge side of the slider and is configured to remove and to detect asperities on a magnetic-recording disk. The slider-surface-shape control mechanism is configured to change a shape of an air-bearing surface (ABS) of the slider and is disposed at a leading-edge side of the slider.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
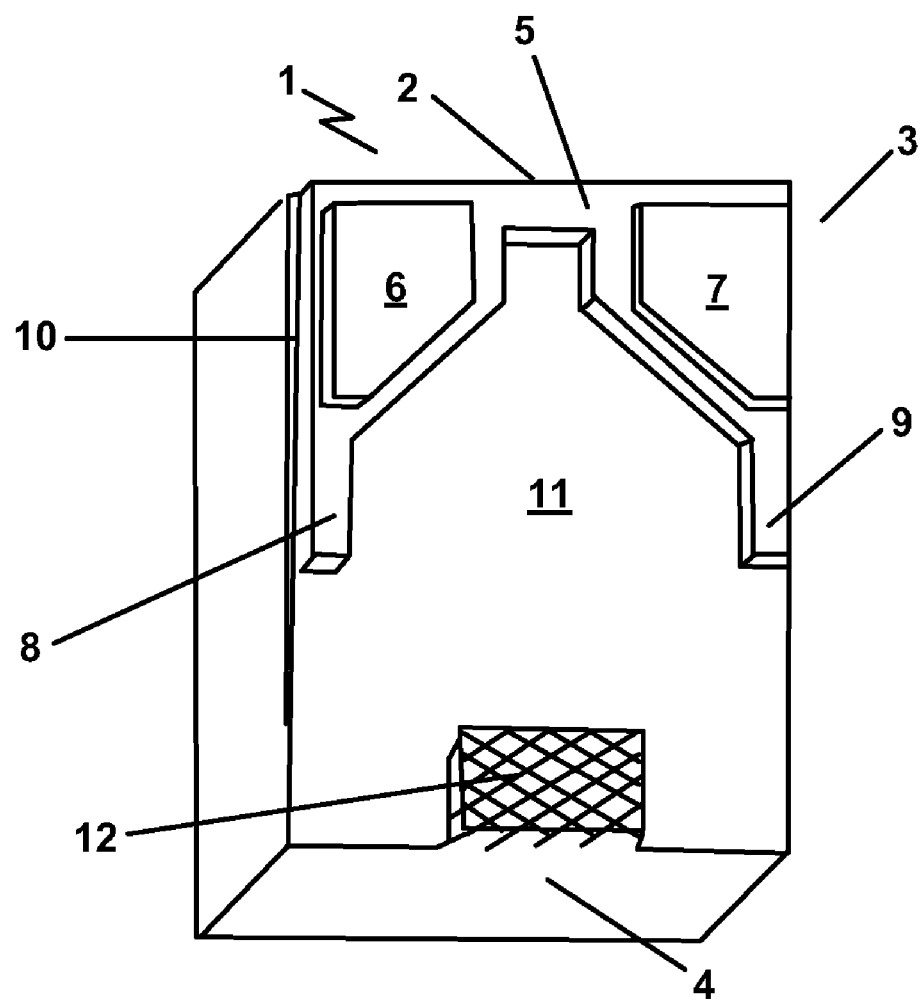
FIG. 1 is a perspective view of a magnetic-recording-disk test-head, in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary. Description of Embodiments of the Present Invention for a Magnetic-Recording-Disk Test-Head and a Method of Manufacturing a Magnetic-Recording Disk Using the Magnetic-Recording-Disk Test-Head In accordance with embodiments of the present invention, fly-height of a magnetic-recording head for writing data to and reading data from a magnetic-recording disk has been reduced year after year as the information-storage capacity of a magnetic-recording disk has increased dramatically in recent years. Moreover, in concert with the increased information-storage capacity of magnetic-recording disks, the fly-height of the burnish-head that removes dust and asperities on the recording surface of the magnetic-recording disk, and the fly-height of the glide-head utilized in surface inspection of the magnetic-recording disk have correspondingly been reduced. However, since the earlier versions of the burnish-head and the glide-head exhibit instabilities in flying at the correspondingly low fly-heights associated with increased information-storage capacity, it is now extremely difficult to efficiently and accurately remove dust and asperities from, and to inspect a recording surface of, a magnetic-recording disk having such increased information-storage capacity.

Embodiments of the present invention provide a magnetic-recording-disk test-head such as burnish-head or glide-head, in which flight stability at a low fly-height is secured, and provide a method of manufacturing a magnetic-recording disk, in which such a magnetic-recording-disk test-head is used. In embodiments of the present invention, a surface-shape control mechanism is mounted on the slider and configured to change a shape of an air-bearing surface (ABS) of a slider of the magnetic-recording-disk test-head, thereby securing flight stability at a low fly-height.

In accordance with embodiments of the present invention, a magnetic-recording-disk test-head includes an ABS for flying in proximity to a recording surface of a rotating magnetic-recording disk at a defined fly-height, a test pad that is configured to remove and to detect asperities on the magnetic-recording disk, and a slider-surface-shape control mechanism that is configured to control a distance between the test pad and the recording surface of the magnetic-recording disk and is disposed at a leading-edge side of the slider. Utilizing the slider-surface-this shape control mechanism, the pitch of the slider is controlled to reduce fly-height of a trailing edge of the slider. The slider-surface-shape control mechanism may be disposed on the test pad disposed at a trailing edge of the slider. As used herein, the term of art, "pitch," refers to a difference between fly-height at the leading edge and fly-height at the trailing edge of the slider. In one embodiment of the present invention, at least two slider-surface-shape control mechanisms are configured to be arranged along a substantially radial direction of the magnetic-recording disk and to be independently controlled to control roll of the slider. As used herein, the phrase, "substantially radial direction of the magnetic-recording disk," refers to a direction that is about parallel to the radial direction of the magnetic-recording disk and allows for any slight deviation from the radial direction of the magnetic-recording disk that might be introduced by skew of the magnetic-recording-disk test-head as a rotary actuator, or arm of a head loader of a spinstand, upon which the magnetic-recording-disk test-head is mounted accesses different portions of the recording surface of the magnetic-recording disk.

As used herein, the term of art, "recording surface," refers to the outermost surface of the magnetic-recording disk that is configured to be disposed in a configuration to receive magnetic flux from a magnetic-recording head for the recording of information within a magnetic-recording medium of the magnetic-recording disk; the magnetic-recording disk may be covered with ancillary layers in addition to the magnetic-recording medium, which may be disposed on top of the magnetic-recording medium of the magnetic-recording disk, and the outermost surfaces of one or more of such ancillary layers may be included in the outermost surface of the magnetic-recording disk. Therefore, the term of art, "recording surface," does not imply that the outermost surface of the magnetic-recording disk is a medium for information storage, itself, but rather is arranged to face the magnetic-recording head in an orientation for the reception of the magnetic flux that records information within the magnetic-recording medium of the magnetic-recording disk.

In another embodiment of the present invention, the test pad has mesh-like grooves on a surface thereof. The mesh-like grooves that are provided on the surface of the test pad increase efficiency in burnishing the recording surface of the magnetic-recording disk.

In another embodiment of the present invention, use of the magnetic-recording-disk test-head provides for correction of the fly-height by bringing the test pad into contact with the magnetic-recording disk, and provides a fly-height test of the magnetic-recording disk.

In accordance with embodiments of the present invention, fly-height of the slider is controlled, so that burnishing and glide-height testing of the recording surface of the magnetic-recording disk can be efficiently and accurately performed. As used herein, glide-height testing may also be referred to by the terms of art, "glide check," or "glide check test;" and, burnishing may also be referred to by the term of art, "burnish test."

Figure 2:
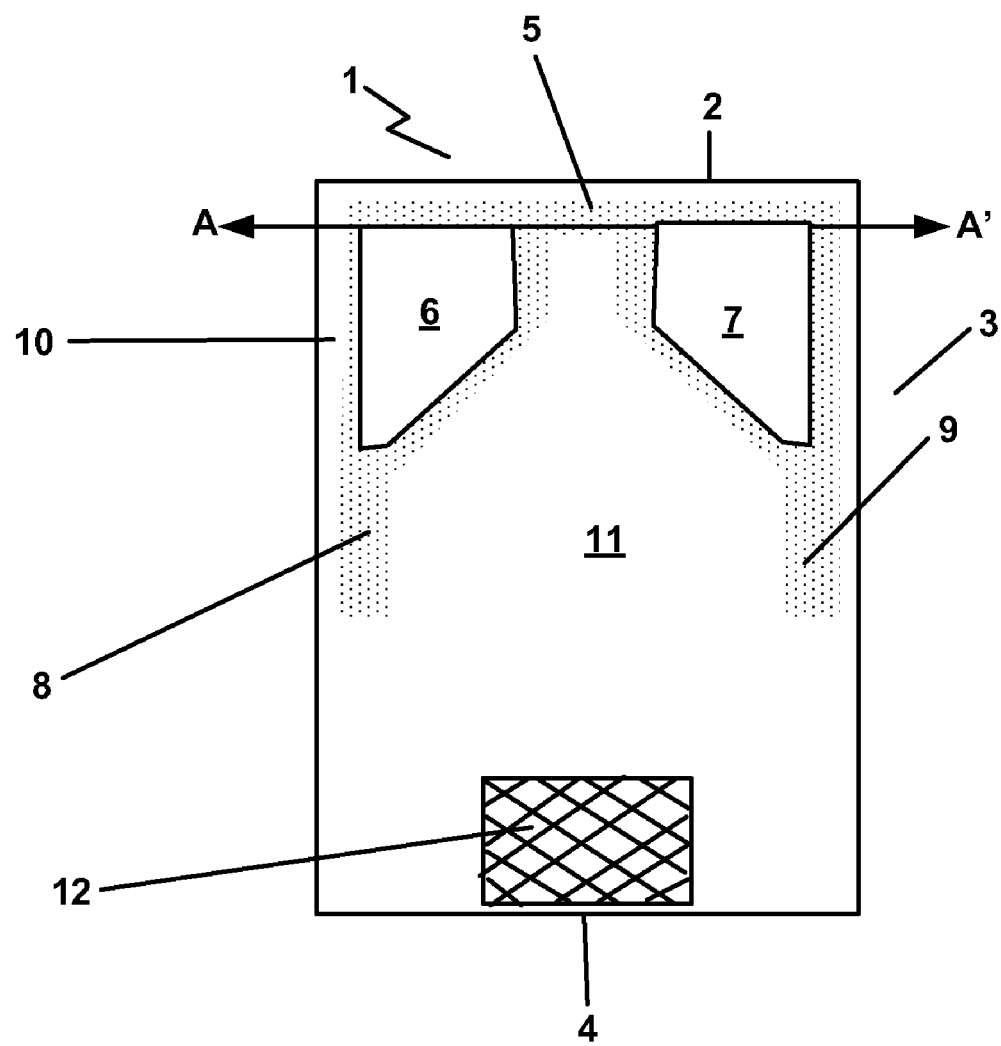
FIG. 2 is a plan view of the magnetic-recording-disk test-head, in accordance with an embodiment of the present invention.
Figure 3A:
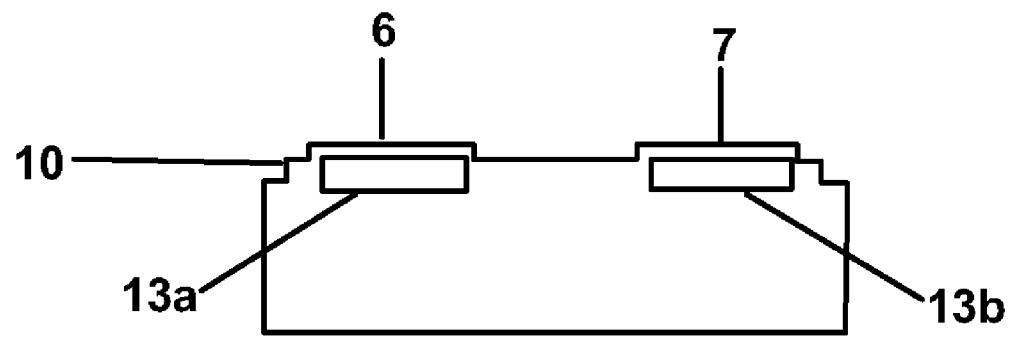
FIG. 3A is cross-sectional view along an A-A' line in FIG. 2, in accordance with an embodiment of the present invention.

With reference now to FIGS. 1, 2 and 3A, in accordance with an embodiment of the present invention, in FIG. 1, a perspective view of a magnetic-recording-disk test-head is shown; in FIG. 2, a plan view of the magnetic-recording-disk test-head is shown; and, in FIG. 3A, a cross-sectional view along an A-A' line in FIG. 2 is shown that schematically illustrates a relative relationship between a leading-edge side-rail surface and a front step air-bearing-surface (ABS) portion. In one embodiment of the present invention, a slider 1 includes a leading edge 2, an air-bearing surface (ABS) 3, a recessed surface 11, a trailing edge 4, and a test pad 12. The ABS 3 includes a front pad 10 including a front-step ABS portion 5 running continuously from the leading edge 2, leading-edge side-rail surfaces 6 and 7 running continuously from the front-step ABS portion 5, and side-step ABS portions 8 and 9 having the same depth as the front-step ABS portion 5. Furthermore, the respective leading-edge side-rail surfaces 6 and 7 have surface-shape control mechanisms 13a and 13b such as a heater, which control fly-height depending on out-of-plane thermal deformation of the ABS 3.

With further reference to FIGS. 1, 2 and 3A, in accordance with an embodiment of the present invention, the surface-shape control mechanism is not limited to a mechanism using thermal deformation, for example, thermal fly-height control (TFC), or alternatively, dynamic flying control (DFC), but may be another mechanism that causes out-of-plane deformation of the ABS 3. In an embodiment of the present invention, the slider further includes a test pad 12 on the trailing edge, which removes dust and asperities from the recording surface of the magnetic-recording disk, and may be used to inspect the recording surface of the magnetic-recording disk. The test pad 12 may have mesh-like grooves having a selected depth, which may be adjusted depending on the means of making such grooves, as is subsequently described. In another embodiment of the present invention, the magnetic-recording-disk test-head includes a piezoelectric element for detecting foreign substances, which is next described.

Figure 3B:
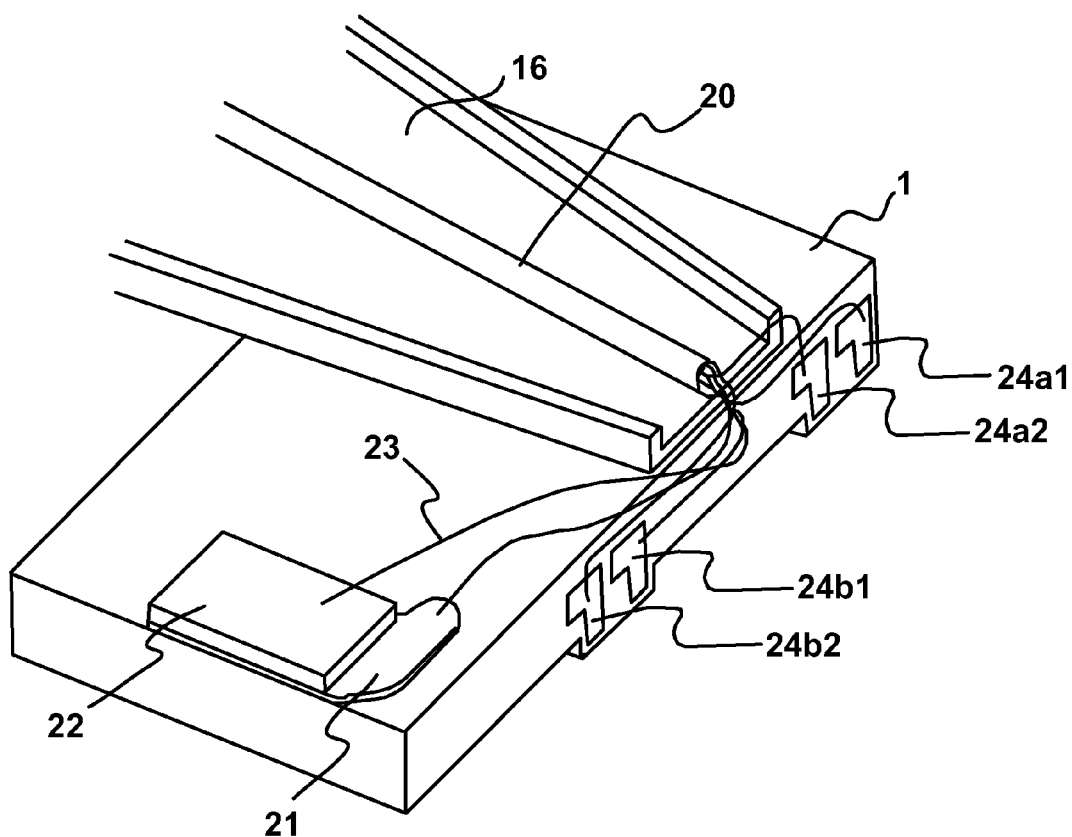
FIG. 3B is a perspective view of the magnetic-recording-disk test-head including a piezoelectric element, in accordance with an embodiment of the present invention.

With reference now to FIG. 3B, in accordance with an embodiment of the present invention, an industrial piezoelectric element material, for example, a quartz resonator ($SiO_2$), barium titanate (BaTiO), lithium niobate ($LiNbO_3$), polyvinylidene fluoride (PVDF), and zinc oxide (ZnO) may be used for the piezoelectric element. The piezoelectric element 22 is disposed on an electrode 21 including copper (Cu) that is disposed on an end of the slider 1, here shown as a backside of the slider 1 to which a suspension 16 is attached. A lead wire 23 is coupled to the piezoelectric element directly, or alternatively, via an electrode (not shown), through which a voltage generated by the piezoelectric element can be observed. The piezoelectric element may include a sintered body, or alternatively, a thin film. Lead wires, of which lead wire 23 is an example, may be routed through an insulating tube 20.

With further reference to FIG. 3B, in accordance with an embodiment of the present invention, electrodes 24a1, 24a2, 24b1 and 24b2 are disposed on an end face of the slider as lead-out electrodes for independently controlling a plurality of slider-surface-shape control mechanisms by electrical heating. In a layout of the electrode terminals 24a1, 24a2, 24b1 and 24b2 in FIG. 3B, the plurality of slider-surface-shape control mechanisms are provided on a trailing-edge side of the slider. However, electrode terminals may be provided on a leading-edge side of the slider on the opposite side of the slider shown in FIG. 3B, through which a plurality of slider-surface-shape control mechanisms can be independently controlled by electrical heating. For detection of foreign substances on the recording surface of the magnetic-recording disk, not only the piezoelectric element mounted on the test-head may be used, but also an acoustic emission (AE) sensor may be similarly used that is disposed on a test-head attachment portion.

Figure 4:
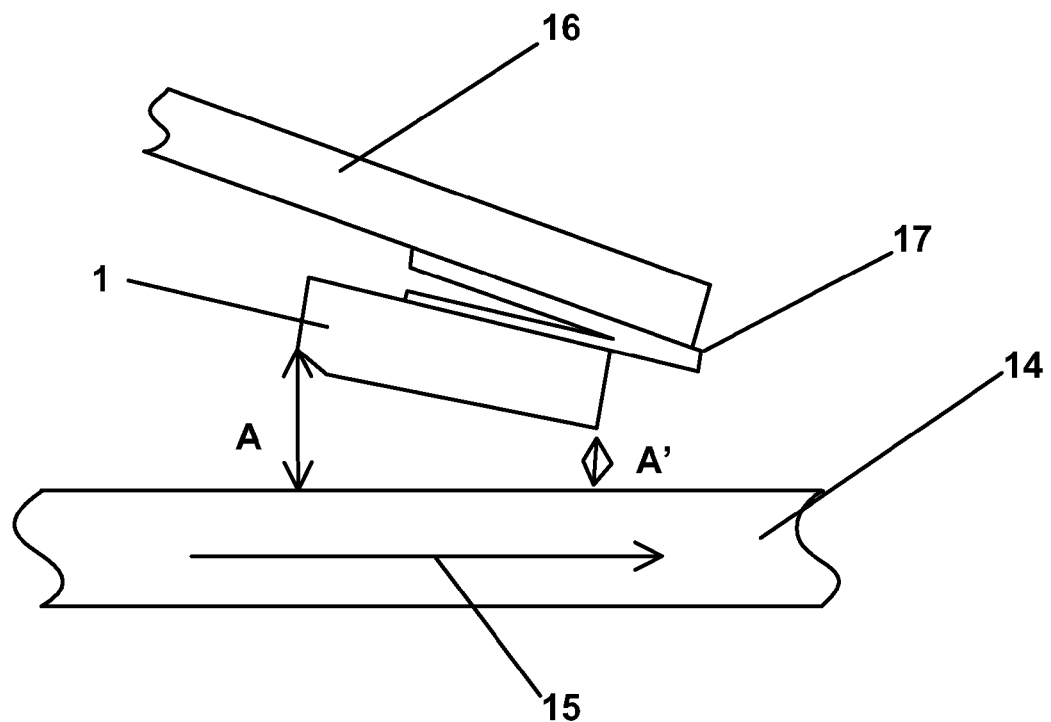
FIG. 4 is a cross-sectional view of the magnetic-recording-disk test-head in flight, in accordance with an embodiment of the present invention.

With reference now to FIG. 4, in accordance with an embodiment of the present invention, the slider 1 is mounted on a suspension 16 via gimbals 17, and flies over a magnetic-recording disk 14; the magnetic-recording disk 14 advances in a direction given by arrow 15. A distance between fly-height A at a leading edge and fly-height A' at a trailing edge as shown in FIG. 4 corresponds to the pitch of the slider 1. In accordance with an embodiment of the present invention, a configuration of the magnetic-recording disk test-head that utilizes the surface-shape control mechanism on the leading-edge side-rail surface in flying a slider over the recording surface of the magnetic-recording disk to efficiently burnish and glide-height test the recording surface of the magnetic-recording disk, is next described. In one embodiment of the present invention, heaters are placed on the leading-edge side-rail surface to provide the surface-shape control mechanism. The heaters are configured to be heated to thermally deform an ABS, causing an out-of-plane projecting deformation, which generates lift on a leading edge of the slider. When electrical power is applied to the heaters, a force in reaction to the lift generated on the leading edge is generated on a trailing edge in a direction of that presses the trailing edge towards the recording surface of the magnetic-recording disk. As a result, the fly-height of the test pad 12 located at the trailing-edge side of the slider is reduced.

Figure 5:
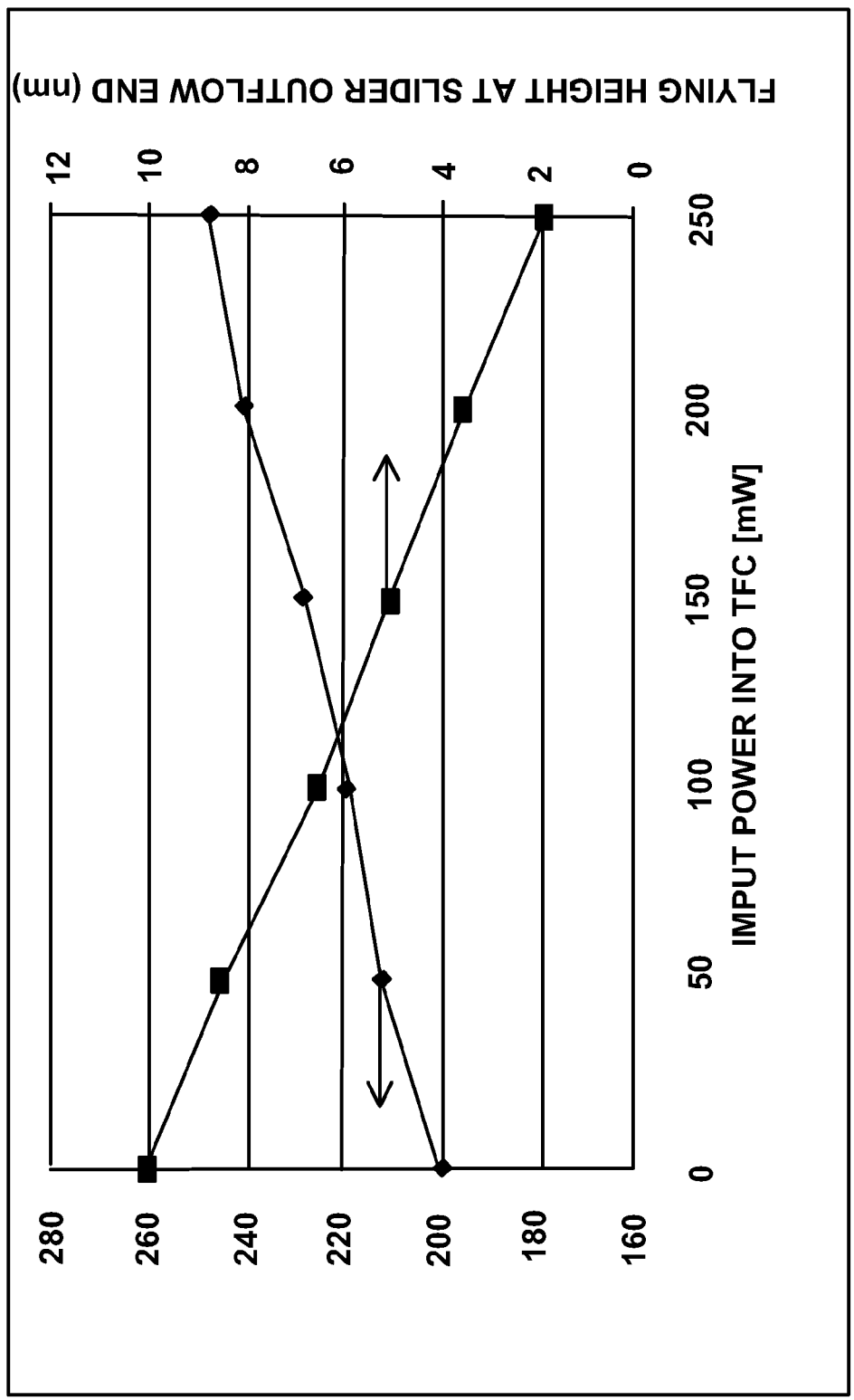
FIG. 5 is a graph showing a relationship between applied electrical power input into a heater and fly-height, in accordance with an embodiment of the present invention.

With reference now to FIG. 5, in accordance with an embodiment of the present invention, a graph of the relationship between electrical power input into the heater and the fly-height at the leading edge, and a graph of the relationship between electrical power input into the heater and the fly-height at the trailing edge are both shown. As input electrical power into the heater is increased, the fly-height at the leading edge is increased, and the fly-height at the trailing edge is conversely decreased, so that pitch is increased. As used herein, the terms of art, "drive," or "driving," refers to the input of electrical power, or application of electrical power, to a slider-surface-shape control mechanism including, by way of example without limitation thereto, a heater, a TFC and a DFC.

Figure 6:
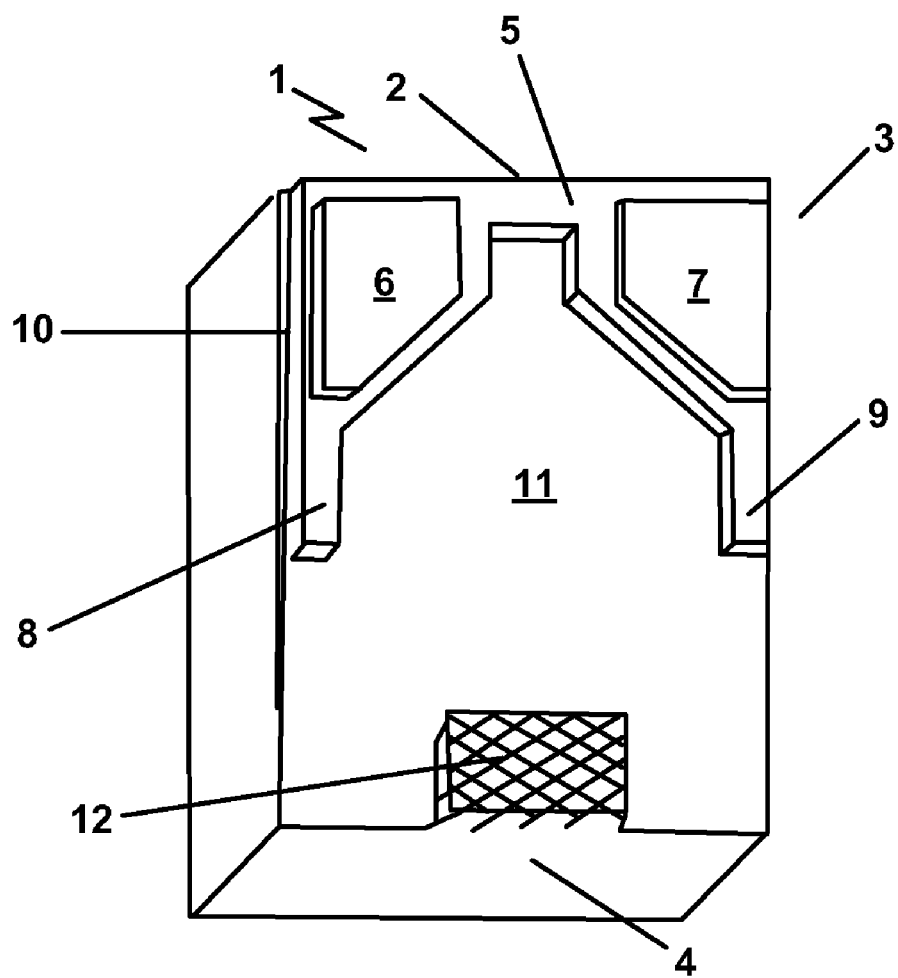
FIG. 6 is a perspective view of the magnetic-recording-disk test-head, in accordance with another embodiment of the present invention.
Figure 7:
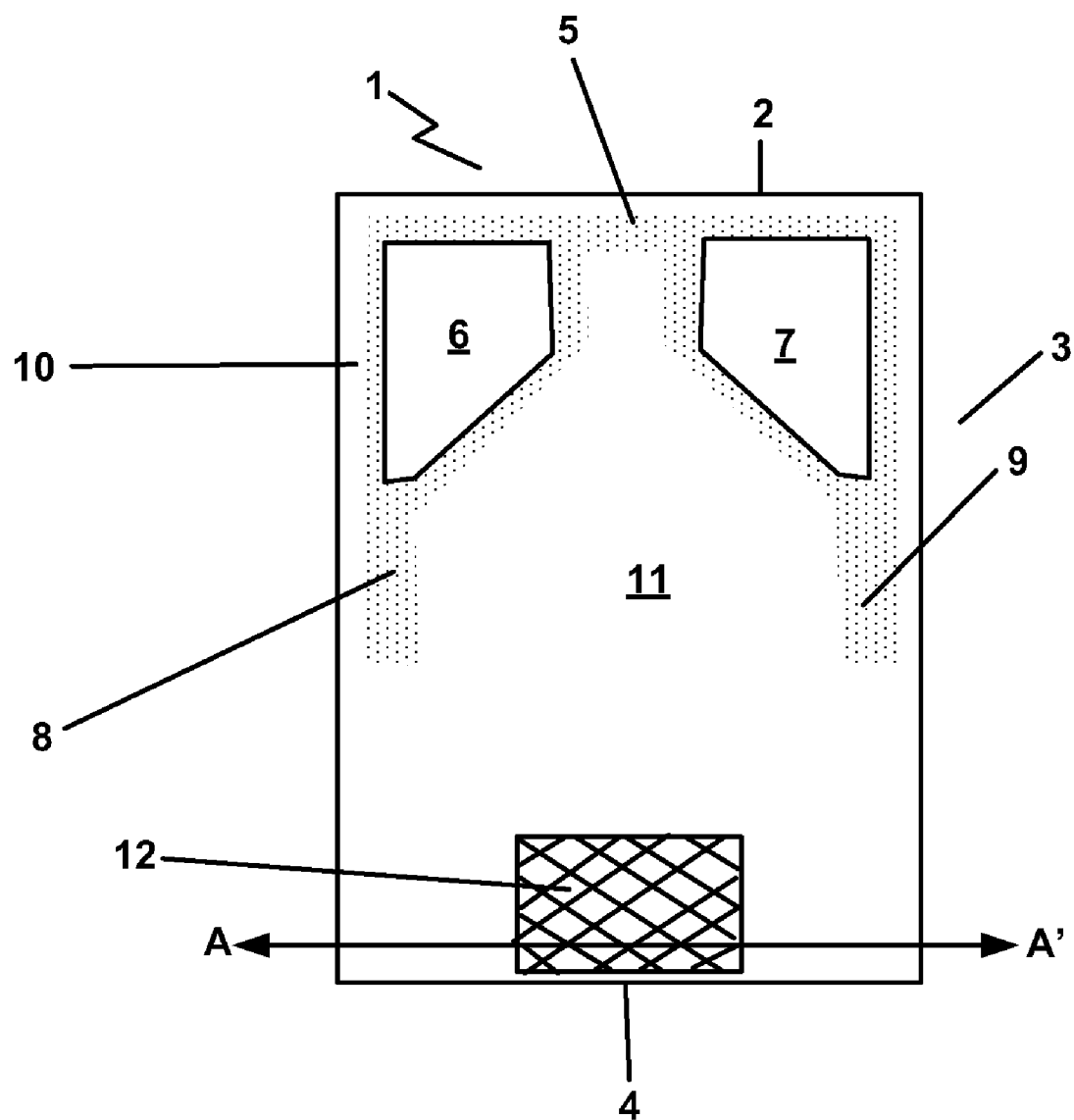
FIG. 7 is a plan view of the magnetic-recording-disk test-head, in accordance with another embodiment of the present invention.
Figure 8:
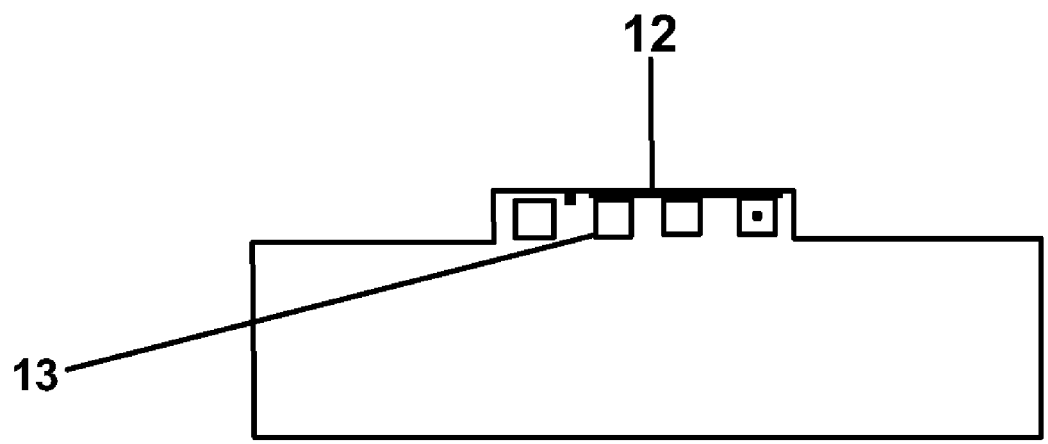
FIG. 8 is a cross-sectional view along an A-A' line in FIG. 7, in accordance with another embodiment of the present invention.

With reference now to FIGS. 6, 7 and 8, in accordance with another embodiment of the present invention, in FIG. 6, a perspective view of a second embodiment of a magnetic-recording-disk test-head is shown; in FIG. 7, a plan view of the magnetic-recording-disk test-head is shown; and, in FIG. 8, a cross sectional view along an A-A' line in FIG. 7 is shown that schematically illustrates a relative relationship between a recessed surface 11 and a test pad 12. In an embodiment of the present invention, the test pad 12 includes a surface-shape control mechanism. In an embodiment of the present invention, a magnetic-recording-disk test-head includes a leading edge 2, an ABS 3, the recessed surface 11, a trailing edge 4, and the test pad 12. The ABS 3 includes a front pad 10 including a front-step ABS portion 5 running continuously from the leading edge 2, leading-edge side-rail surfaces 6 and 7 running continuously from the front-step ABS portion 5, and side-step ABS portions 8 and 9 having the same depth as the front-step ABS portion 5. In accordance with an embodiment of the present invention, the test pad 12 disposed at the trailing edge has mesh-like grooves having a selected depth, which may be adjusted depending on the means of making such grooves, as is subsequently described. In addition, the test pad 12 includes a surface-shape control mechanism 13 such as a heater, by way of example without limitation thereto. Thus, the surface-shape control mechanism is not limited to a mechanism using thermal deformation; and, a mechanism that may cause out-of-plane deformation of an ABS can be used. The test pad 12, which actually performs removal of foreign substances, includes the surface-shape control mechanism, which provides that the fly-height of the test pad 12 can be directly changed. In an embodiment of the present invention, since the test pad 12 performs not only removal of asperities, but also detection of asperities, grooves are provided in the test pad 12 to discharge foreign substances removed from the recording surface of the magnetic-recording disk via the grooves.

With further reference to FIG. 6, in accordance with an embodiment of the present invention, the grooves may be provided in a surface of the test pad by forming a pattern by projection lithography using photoresist, and then cutting the pattern by Ar ion etching. Alternatively, the grooves may be provided by mechanical cutting by using a slicer. Protrusions and grooves, each having a width of 0.15 to 0.20 mm, were alternately formed at regular intervals on the slider surface. While an angle formed within the lattice of grooves in the test pad 12 shown in FIG. 6 may be a right angle, the grooves were arranged such that an angle formed between the grooves of the test pad and the circumferential direction of the magnetic-recording disk was not a right angle. Depth of each groove cut by Ar ion etching was 1 µm to 10 µm. If mechanical cutting is used, the grooves were able to be made deeper, so that the depth was 5 µm to 50 µm.

Figure 9:
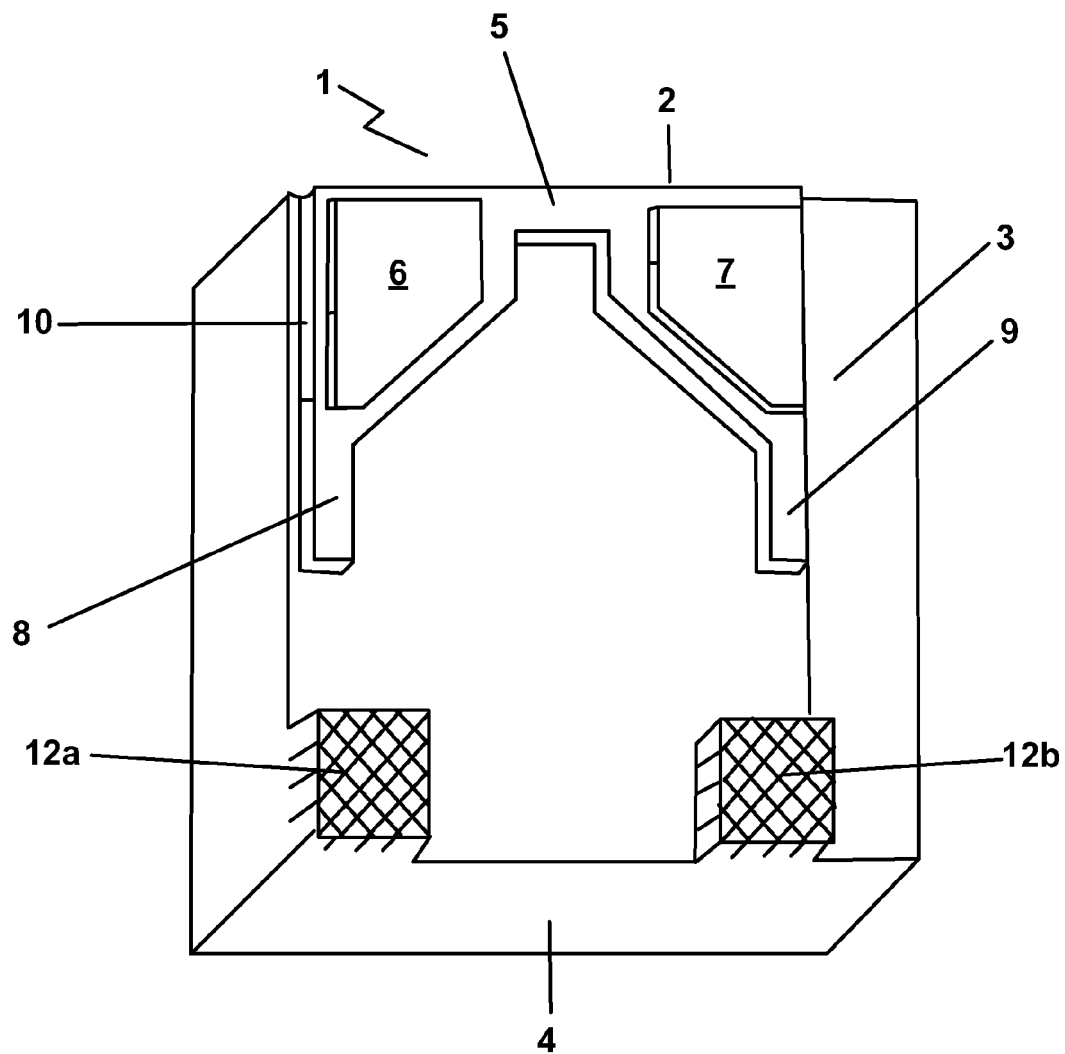
FIG. 9 is a perspective view of the magnetic-recording-disk test-head, in accordance with yet another embodiment of the present invention.
Figure 10:
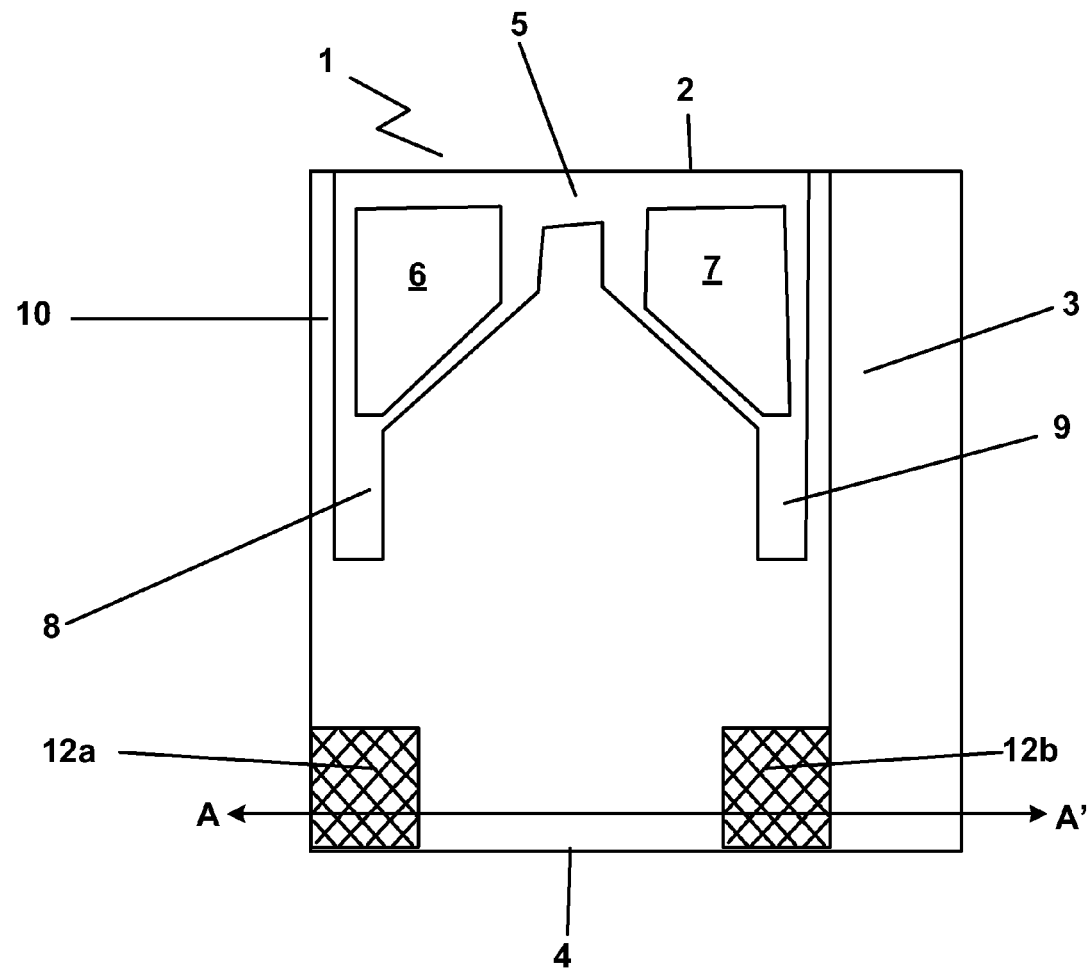
FIG. 10 is a plan view of the magnetic-recording-disk test-head, in accordance with yet another embodiment of the present invention.
Figure 11:
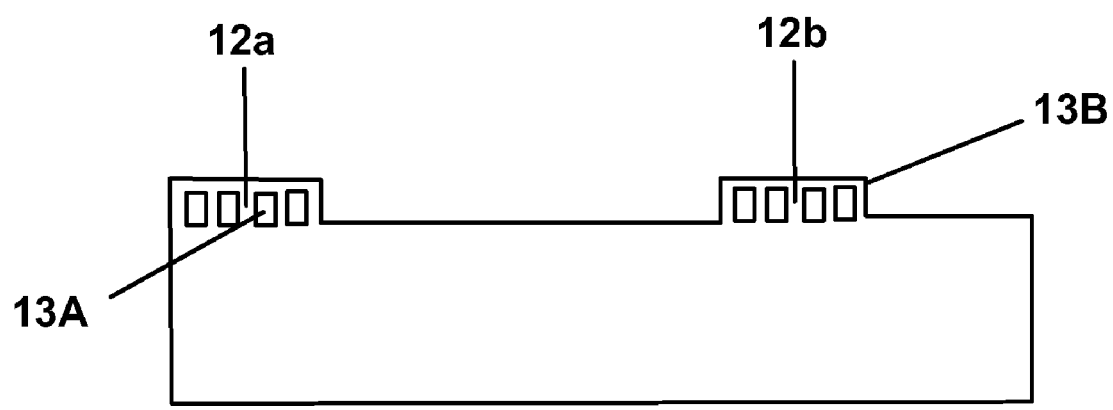
FIG. 11 is a cross-sectional view along an A-A' line in FIG. 10, in accordance with yet another embodiment of the present invention.

With reference now to FIGS. 9, 10 and 11, in accordance with yet another embodiment of the present invention, in FIG. 9, a perspective view of a magnetic-recording-disk test-head is shown; in FIG. 10, a plan view of the magnetic-recording-disk test-head is shown; and, in FIG. 11, a cross-sectional view along an A-A' line in FIG. 10 is shown that schematically illustrates a relative relationship between the recessed surface 11 and the test pad 12. In one embodiment of the present invention, a magnetic-recording-disk test-head includes a leading edge 2, an ABS 3, a recessed surface 11, a trailing edge 4, and test pads 12a and 12b similar to embodiments of the present invention for the magnetic-recording-disk test-head described above in the discussion of FIGS. 6, 7 and 8. The ABS 3 includes a front pad 10 including a front-step ABS portion 5 running continuously from the leading edge 2, leading-edge side-rail surfaces 6 and 7 running continuously from the front-step ABS portion 5, and side-step ABS portions 8 and 9 having the same depth as the front-step ABS portion 5. In accordance with an embodiment of the present invention, two test pads 12a and 12b are disposed at inner and outer circumferential sides of the trailing edge, and provided with mesh-like grooves having a selected depth, which may be adjusted depending on the means of making such grooves, as described above in the discussion of FIG. 6. The test pads 12a and 12b include surface-shape control mechanisms 13a and 13b, respectively, such as heaters, by way of example without limitation thereto. Thus, each of the surface-shape control mechanisms is not limited to a mechanism using thermal deformation, and a mechanism that may cause out-of-plane deformation of an ABS can be used. The test pads 12a and 12b, which actually perform removal of foreign substances, include the surface-shape control mechanisms respectively, which provide that the fly-heights of the respective test pads 12a and 12b can be directly changed. In an embodiment of the present invention, since the test pads 12a and 12b perform not only removal of asperities, but also detection of asperities, grooves are provided in the respective test pads 12a and 12b so as to discharge foreign substances removed from the recording surface of the magnetic-recording disk via the grooves. The two test pads 12a and 12b are disposed at both ends of the slider trailing edge, which enables burnishing and glide-height testing over the whole recording surface of the magnetic-recording disk in a certified flyability area. As described herein, the certified flyability area may be an actual data recording area of the magnetic-recording disk in a condition that exists, for example, when the magnetic-recording disk is assembled into a hard-disk drive (HDD).

Figure 12:
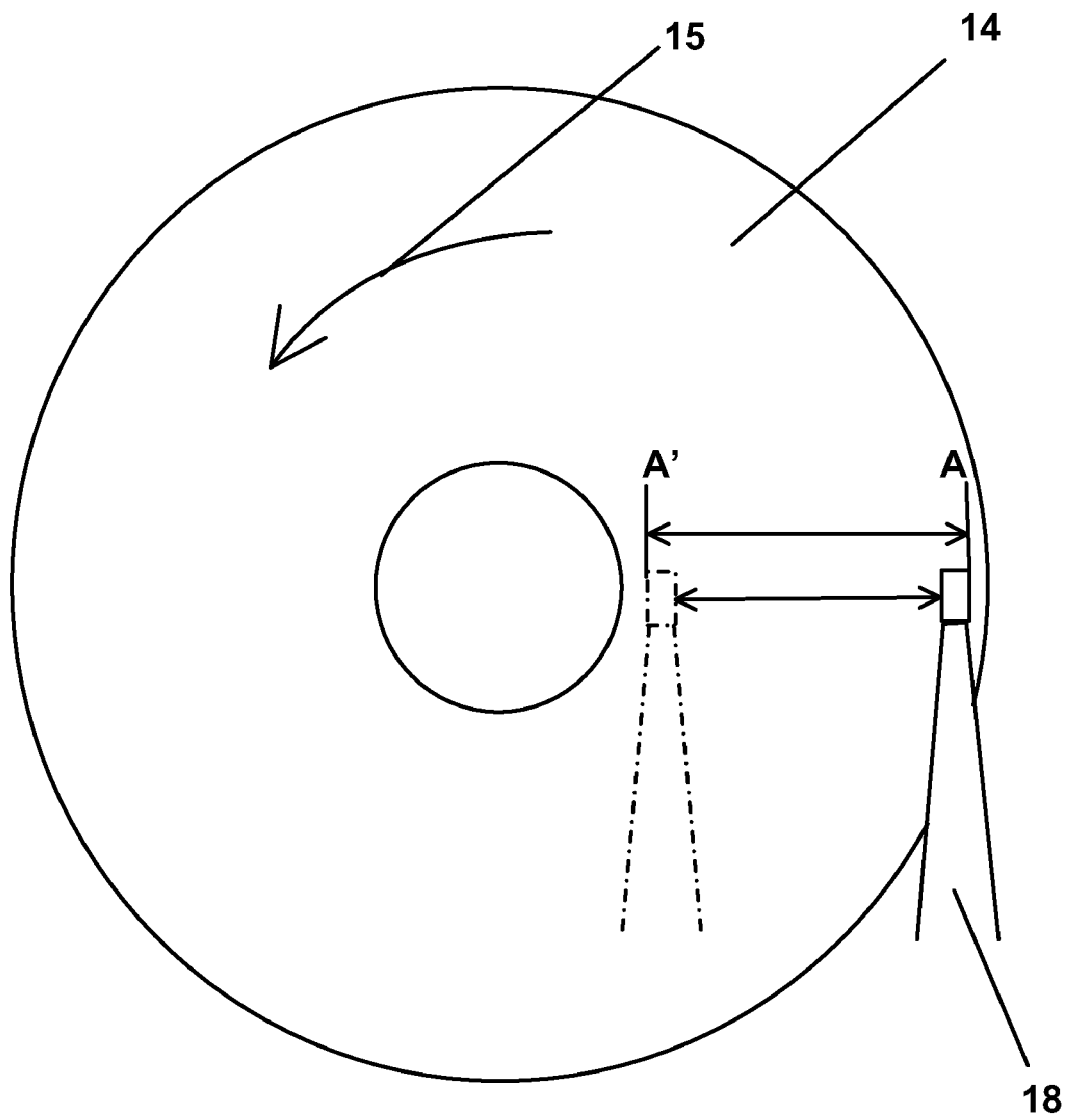
FIG. 12 is a plan view showing an operation direction of the magnetic-recording-disk test-head when a magnetic-recording disk is tested, in accordance with an embodiment of the present invention.

With reference now to FIG. 12, in accordance with an embodiment of the present invention, a positional relationship between the magnetic-recording-disk test-head and a magnetic-recording disk 14 in burnishing and glide-height testing is shown. After the magnetic-recording disk 14 is rotated in a direction of arrow 15 at a predetermined rotational frequency, a magnetic-recording-disk test-head 18 is loaded onto the magnetic-recording disk at a position A and moved between A and A', so that burnishing and glide-height testing are performed. In one embodiment of the present invention, the motion between A and A' is the motion that is produced by a linear actuator mechanism, for example, such as the arm and head loader of a spinstand upon which a suspension with an attached magnetic-recording-disk test-head may be mounted, by way of example without limitation thereto. However, other types of actuator mechanisms such as a rotary actuator, for example, as may be found in a HDD, are also within the spirit and scope of embodiments of the present invention. A line between A and A' in FIG. 12 corresponds to the certified flyability area.

Figure 13:
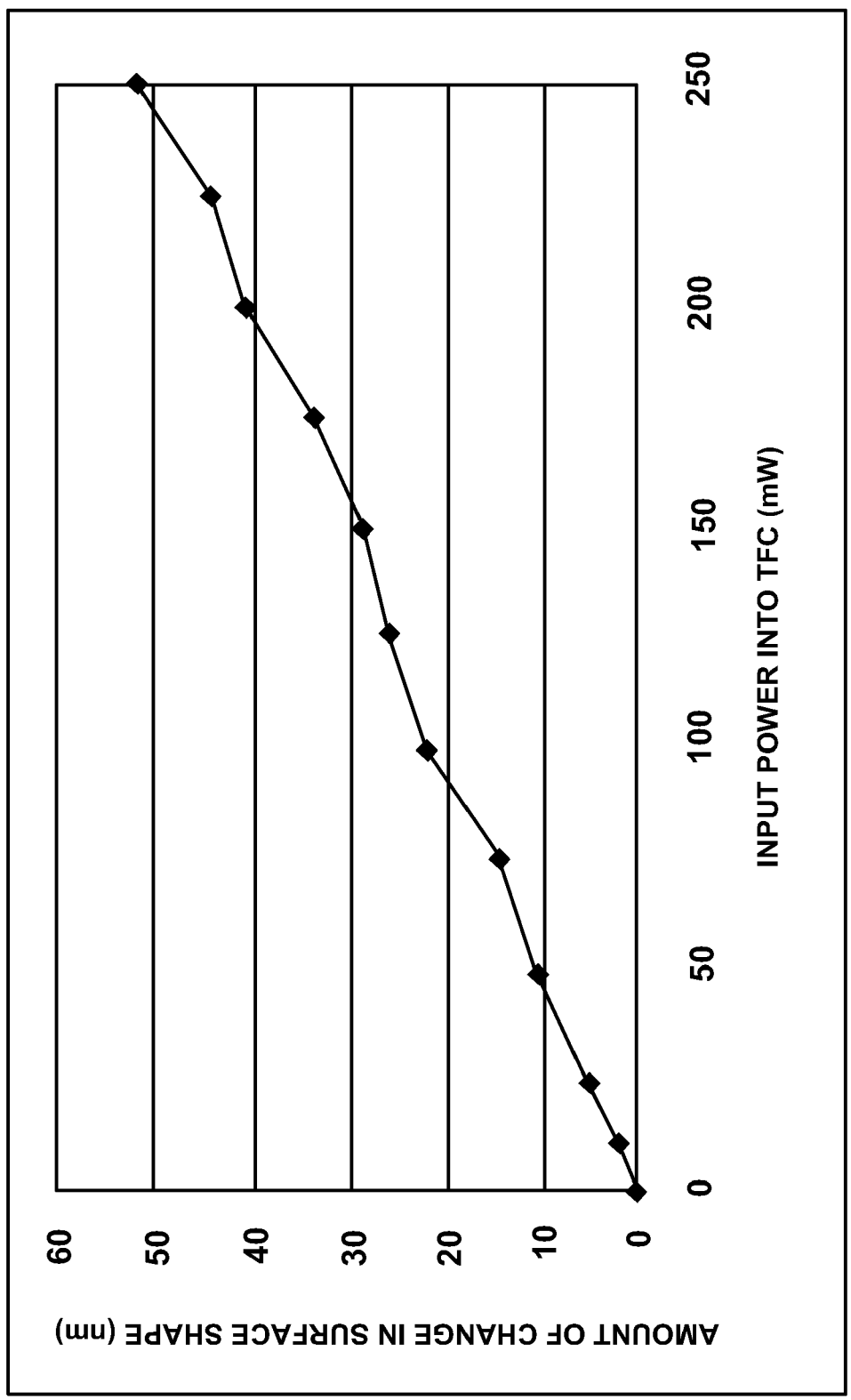
FIG. 13 is a graph showing a relationship between applied electrical power input into a heater and amount of change in surface shape, in accordance with embodiments of the present invention.

With reference now to FIG. 13, in accordance with an embodiment of the present invention, an example of an amount of change in surface shape as a function of applied electrical power to the TFC of the magnetic-recording-disk test-head used for embodiments of the present invention described above in the discussions of FIGS. 6, 7 and 8, and FIGS. 9, 10 and 11, respectively, is shown. As shown in FIG. 13, as the applied electrical power is increased, the amount of change in surface shape, which is the amount of protrusion, of the test pad is increased, and accordingly a distance between a recording surface of a magnetic-recording disk and the test pad is reduced.

Figure 14:
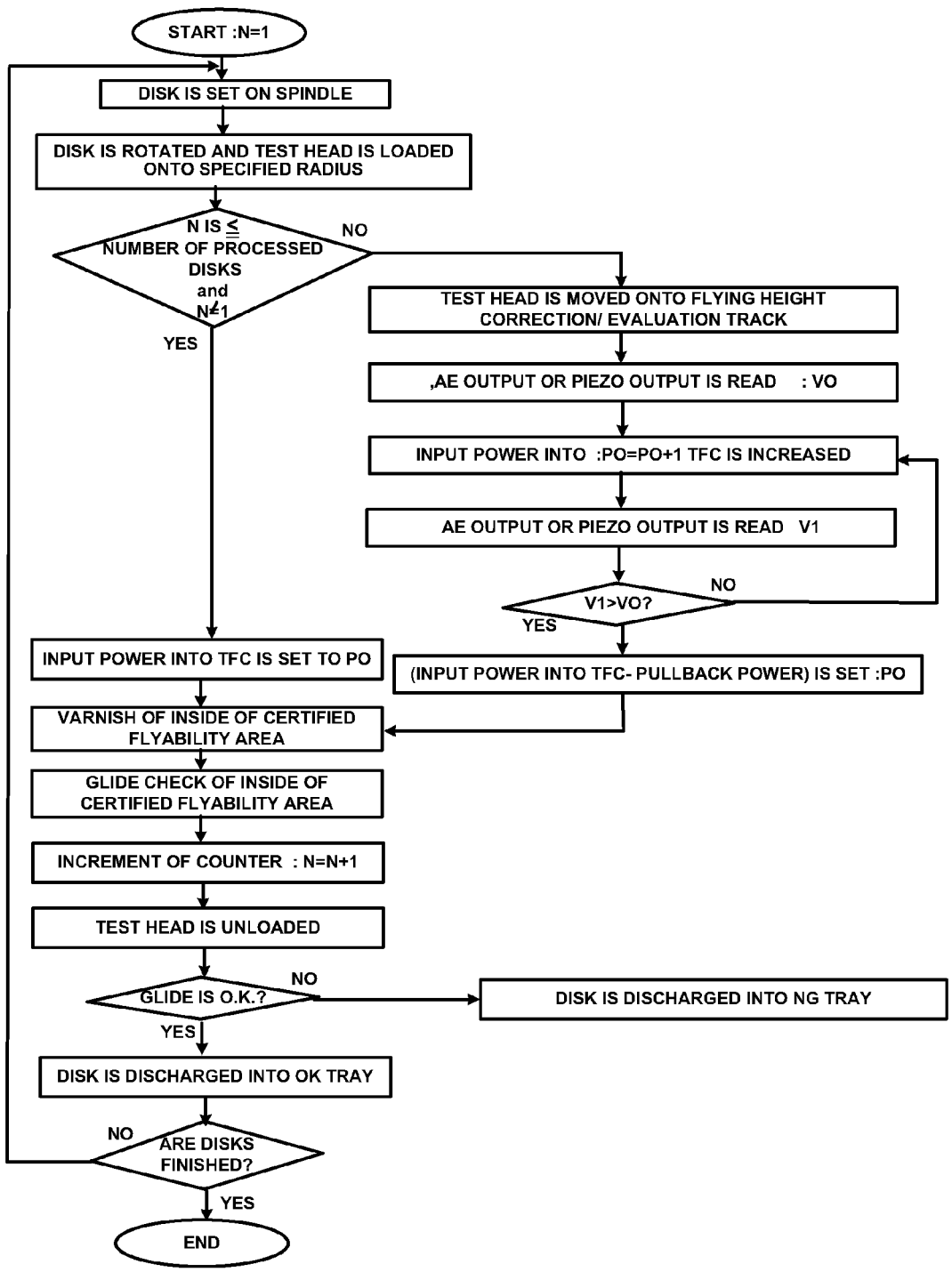
FIG. 14 is a flowchart of a method for burnishing and glide-height testing of a magnetic-recording disk by using the magnetic-recording-disk test-head, in accordance with an Embodiment of the present invention.

With reference now to FIG. 14, in accordance with embodiments of the present invention, a flowchart of burnishing and glide-height testing using the magnetic-recording-disk test-head is shown. The flowchart shows an example method for using the thermal deformation caused by a heater as the surface-shape control mechanism. A magnetic-recording disk, after having been fabricated with thin-film deposition processes, is set on a spindle; then, the magnetic-recording-disk test-head described in embodiments of the present invention described above in the discussions of FIGS. 1, 2 3A, 3B and 4, FIGS. 6, 7 and 8, and FIGS. 9, 10 and 11, respectively, by way of example without limitation thereto, is loaded on the magnetic-recording disk; and, an output from the piezoelectric element, or alternatively, the AE sensor, which is mounted on the magnetic-recording-disk test-head, is read on a fly-height correction-and-evaluation track while gradually increasing electrical power input into the heater, until a point at which the output increases is detected. When the magnetic-recording-disk test-head begins to contact with the magnetic-recording disk, output from the piezoelectric element, or alternatively, output from the AE sensor, increases. The fly-height is taken to be 0 nm at the point from which the output increases; and, the magnetic-recording-disk test-head is operated while reducing applied electrical power to correspond to a desired fly-height from an applied electrical power input to the TFC. Thus, burnishing and glide-height testing can be stably performed at a selected fly-height for a magnetic-recording-disk test-head, in accordance with embodiments of the present invention.

With further reference to FIG. 14, in accordance with embodiments of the present invention, the fly-height correction-and-evaluation track is set outside the certified flyability area of the magnetic-recording disk. Moreover, the fly-height correction-and-evaluation track may be provided at two different areas outside the certified flyability area, for example, an area inside an innermost circumference of the certified flyability area, and an area outside an outermost circumference of the certified flyability area; the fly-height correction is performed; and, then interpolation is performed between two points on the respective tracks so that input electrical power is determined depending on a radial position. Thus, in an embodiment of the present invention, stable fly-height can be set over the recording surface of the magnetic-recording disk in the certified flyability area. Such fly-height correction is repeatedly performed for a number of disks that are selected to be processed, which enables correction for changes in the fly-height that occur with the passage of time in the course of processing magnetic-recording disks.

With further reference to FIG. 14, in accordance with embodiments of the present invention described above in the discussions of FIGS. 1, 2, 3A, 3B and 4, FIGS. 6, 7 and 8, and FIGS. 9, 10 and 11, respectively, by way of example without limitation thereto, for the magnetic-recording-disk test-head, fly-height correction is performed in a manner that the surface-shape control mechanisms on inner and outer circumferential sides are separately controlled. Thus, in accordance with an embodiment of the present invention, fly-height correction can be made even in a roll direction, and consequently a more stable test can be performed. Roll correction may be performed according to the following procedure. First, while electrical power that is input to the TFC situated on an inner circumferential side of the magnetic-recording disk is gradually increased, output from the piezoelectric element, or alternatively, the AE sensor, mounted on the magnetic-recording-disk test-head is read, so that a point from which the output increases is detected. Upon a detection of increased output from the piezoelectric element, or alternatively, the AE sensor, the input of electrical power to the TFC situated on an outer circumferential side is shut off. Then, electrical power that is input into the TFC situated on the inner circumferential side is shut off; and, while electrical power that is input into the TFC situated on the outer circumferential side is gradually increased, output from the piezoelectric element, or alternatively, AE sensor, mounted on the magnetic-recording-disk test-head is read, so that a point from which the output increases may be detected. The fly-height is taken to be 0 nm at the point from which the output from the piezoelectric element, or alternatively, AE sensor, increases for each TFC, and the magnetic-recording-disk test-head is operated while reducing applied electrical power to correspond to a desired fly-height from an applied electrical power input into the TFC. Thus, in accordance with an embodiment of the present invention, roll correction can be performed.

Figure 15:
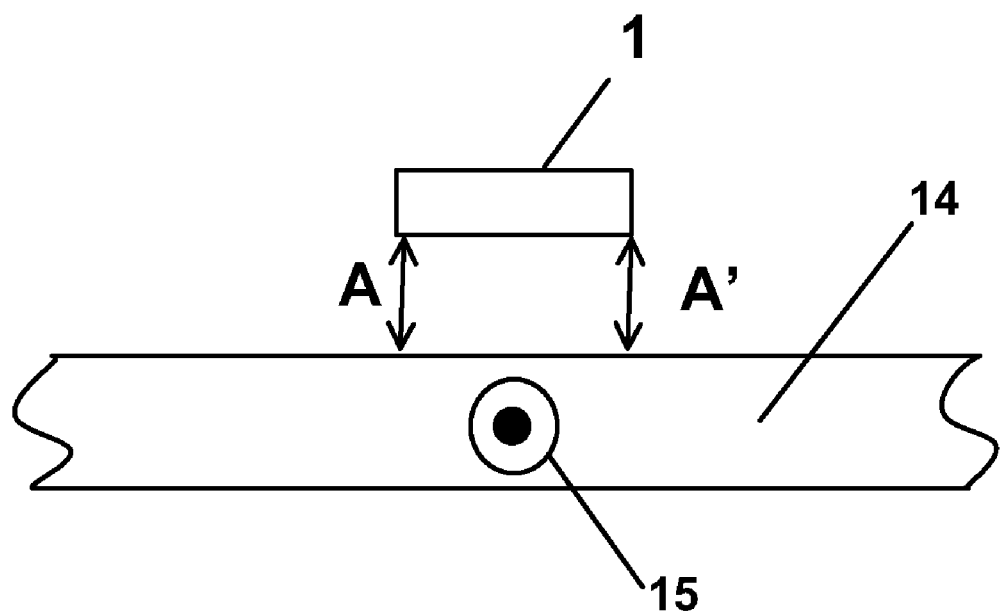
FIG. 15 is an elevation view of the magnetic-recording-disk test-head in flight as viewed from a trailing edge of the magnetic-recording-disk test-head, in accordance with an embodiment of the present invention.

With reference now to FIG. 15, in accordance with embodiments of the present invention, an elevation view of the magnetic-recording-disk test-head is shown in flight as viewed from a trailing edge of the magnetic-recording-disk test-head. As used herein, the term of art, "roll," refers to a difference in the fly-height when a magnetic-recording-disk test-head is seen from the trailing edge that corresponds to the difference in fly-height between A and A' as shown in FIG. 15.

With further reference to FIG. 14, in accordance with embodiments of the present invention, for example, when 10,000 magnetic-recording disks were subjected to burnishing and glide-height testing at a fly-height of 4 nm by using the magnetic-recording-disk test-head shown in embodiments of the present invention described above in the discussions of FIGS. 1, 2, 3A, 3B and 4, a yield of the magnetic-recording disks was 89.2% for the case in which roll correction was not performed. On the other hand, a yield of the magnetic-recording disks was 92.3% for the case in which roll correction was performed. Similarly, when 10,000 magnetic-recording disks were subjected to burnishing and glide-height testing by using the magnetic-recording-disk test-head shown in embodiments of the present invention described above in the discussions of FIGS. 9, 10 and 11, a yield of the magnetic-recording disks was 90.5% for the case in which roll correction was not performed. On the other hand, a yield of the magnetic-recording disks was 93.0% for the case in which roll correction was performed. In each case, more effective burnishing and stable glide-height testing were achieved by performing roll correction. Thus, in accordance with embodiments of the present invention, the yield was increased.

With further reference to FIG. 14, in accordance with embodiments of the present invention, fly-height during burnishing is lowered compared with fly-height during glide-height testing. Thus, in accordance with embodiments of the present invention, during burnishing, foreign substances such as dust and abnormal asperities on a recording surface of a magnetic-recording disk can be more effectively removed. In glide-height testing, output from the piezoelectric element, or alternatively, the AE sensor, which occur when a test pad of a magnetic-recording-disk test-head flying on a magnetic-recording head collides with a foreign substance such as dust, or an abnormal asperity, on the recording surface of the magnetic-recording disk, may have a value equal to or greater than a threshold value; upon reaching a value equal to or greater than the threshold value, a determination is made that the recording surface of the magnetic-recording disk is "no good" (NG).

With further reference to FIG. 14, in accordance with embodiments of the present invention, typically, a magnetic-recording disk is fabricated as follows: a magnetic film is deposited; in a subsequent operation, a carbon-based hard protective film is deposited; and, in a still later operation, lubricant is coated on a surface of the protective film. However, in accordance with an embodiment of the present invention, a magnetic-recording-disk test-head may be used in burnishing and glide-height testing of a recording surface of a magnetic-recording disk fabricated as follows: the magnetic film is deposited; in a subsequent operation, a surface of the magnetic film is subjected to oxidation treatment by oxygen aching, or alternatively, leaving the magnetic-recording disk in a high-humidity atmosphere; and, in a still later operation, the lubricant is directly coated on the surface. Thus, in accordance with an embodiment of the present invention, it was found that burnishing and glide-height testing can be stably performed at a fly-height of 2 nm. Thus, in accordance with an embodiment of the present invention, a fly-height corresponding to thickness of the protective film can be reduced, and consequently an excellent electromagnetic conversion characteristic can be obtained. In accordance with an embodiment of the present invention, burnishing and glide-height testing are able to be stably performed independent of the diameters of the magnetic-recording disks used in burnishing and glide-height testing, which are 89 mm, 65 mm and similar dimensions. In addition, in accordance with an embodiment of the present invention, burnishing and glide-height testing can be stably performed within a rotational frequency range from 60 revolutions per second (rps) (3600 revolutions per minute (rpm)) to 250 rps (15000 rpm).

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A magnetic-recording-disk test-head, comprising:
   a slider having a leading edge and a trailing edge,
   a test pad disposed at a trailing-edge side of said slider, said test pad configured to detect and remove and to detect asperities on a magnetic-recording disk, and
   a slider-surface-shape control mechanism, wherein said slider-surface-shape control mechanism is configured to change a shape of an air-bearing surface of said slider and is disposed at a leading-edge side of said slider.

2. The magnetic-recording-disk test-head of claim 1, wherein said test pad has mesh-like grooves on a surface thereof.

3. The magnetic-recording-disk test-head of claim 1, wherein a plurality of slider-surface-shape control mechanisms are disposed on said magnetic-recording-disk test-head and are configured to be arranged along a substantially radial direction of said magnetic-recording disk, and said plurality of slider-surface-shape control mechanisms are configured to be independently controlled to control a roll of said slider.

4. The magnetic-recording-disk test-head of claim 3, wherein said test pad has mesh-like grooves on a surface thereof.

5. A magnetic-recording-disk test-head, comprising:
   a slider having a leading edge and a trailing edge, and
   a test pad disposed at a trailing-edge side of said slider, said test pad configured to detect and remove and to detect asperities on a magnetic-recording disk,
   wherein said test pad has a slider-surface-shape control mechanism, said slider-surface-shape control mechanism configured to control a distance between said test pad and a recording surface of said magnetic-recording disk.

6. The magnetic-recording-disk test-head of claim 5, wherein said test pad has mesh-like grooves on a surface thereof.

7. The magnetic-recording-disk test-head of claim 5, wherein a plurality of slider-surface-shape control mechanisms are disposed on said magnetic-recording-disk test-head and are configured to be arranged along a substantially radial direction of said magnetic-recording disk, and said plurality of slider-surface-shape control mechanisms are configured to be independently controlled to control a roll of said slider.

8. The magnetic-recording-disk test-head of claim 7, wherein said test pad has mesh-like grooves on a surface thereof.

9. A method of manufacturing a magnetic-recording disk, said method comprising:
   rotating said magnetic-recording disk;
   positioning a magnetic-recording-disk test-head on a predetermined track of said magnetic-recording disk, said magnetic-recording-disk test-head including:
      a slider having a leading edge and a trailing edge,
      a test pad that is disposed at a trailing-edge side of said slider, said test pad configured to detect and remove and to detect asperities on said magnetic-recording disk, and
      a slider-surface-shape control mechanism, said slider-surface-shape control mechanism configured to change a shape of an air-bearing surface of said slider;
   driving said slider-surface-shape control mechanism of said magnetic-recording-disk test-head to control a pitch of said slider, so that said test pad is placed in contact with said magnetic-recording disk;
   driving said slider-surface-shape control mechanism while reducing an applied electrical power to correspond to a desired fly-height from an applied electrical power when said test pad contacts said magnetic-recording disk, so that fly-height is corrected to said desired fly-height; and
   burnishing a recording surface of said magnetic-recording disk by said magnetic-recording-disk test-head.

10. The method of manufacturing a magnetic-recording disk of claim 9, wherein said slider-surface-shape control mechanism is disposed at a leading-edge side of said slider.

11. The method of manufacturing a magnetic-recording disk of claim 10, wherein said magnetic-recording-disk test-head has a plurality of said slider-surface-shape control mechanisms that are configured to be arranged along a substantially radial direction of said magnetic-recording disk, and are configured to be independently controlled to control a roll of said slider.

* * * * *